(12) United States Patent
Gauthier

(10) Patent No.: US 10,124,802 B2
(45) Date of Patent: Nov. 13, 2018

(54) CONTROLLED VEHICLE DECELERATION BASED ON A SELECTED VEHICLE DRIVING MODE

(71) Applicant: Toyota Motor Engineering & Manufacturing North America, Inc., Erlanger, KY (US)

(72) Inventor: Christopher T. Gauthier, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 124 days.

(21) Appl. No.: 15/242,500

(22) Filed: Aug. 20, 2016

(65) Prior Publication Data

US 2018/0050699 A1  Feb. 22, 2018

(51) Int. Cl.
| | |
|---|---|
| *B60W 30/00* | (2006.01) |
| *B60W 30/18* | (2012.01) |
| *B60W 10/30* | (2006.01) |
| *B60W 10/10* | (2012.01) |
| *B60W 10/04* | (2006.01) |

(52) U.S. Cl.
CPC ...... *B60W 30/18009* (2013.01); *B60W 10/04* (2013.01); *B60W 10/10* (2013.01); *B60W 10/30* (2013.01); *B60W 2420/10* (2013.01); *B60W 2420/24* (2013.01); *B60W 2420/503* (2013.01); *B60W 2520/10* (2013.01); *B60W 2520/105* (2013.01); *B60W 2710/0605* (2013.01); *B60W 2710/10* (2013.01); *B60W 2710/30* (2013.01); *B60Y 2300/18008* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,585,798 | A | * | 12/1996 | Yoshioka | B60T 8/172 342/107 |
| 5,669,673 | A | * | 9/1997 | Reuter | B60T 8/4013 188/358 |
| 5,762,406 | A | * | 6/1998 | Yasui | B60T 8/1755 303/113.5 |
| 5,941,919 | A | * | 8/1999 | Pastor | B60T 8/1755 303/140 |

(Continued)

*Primary Examiner* — Jonathan L Sample
(74) *Attorney, Agent, or Firm* — Christopher G. Darrow; Darrow Mustafa PC

(57) ABSTRACT

A device and method for a controlled deceleration based on a selected vehicle driving mode are disclosed, in which upon sensing a deceleration of a vehicle, a plurality of deceleration control signals based on a deceleration target for the selected vehicle driving mode are produced. At least one of the plurality of deceleration control signals are transmitted to prompt a controlled deceleration of the vehicle to correspond with a deceleration target for the selected vehicle driving mode. The method receives sensor data relating to the deceleration of the vehicle, and compares at least some of the sensor data with the deceleration target to generate a deceleration feedback signal. The method provides for adjusting the plurality of deceleration control signals based on the deceleration feedback signal to effect the controlled deceleration.

20 Claims, 7 Drawing Sheets

(56) References Cited

U.S. PATENT DOCUMENTS

| | | | | |
|---|---|---|---|---|
| 6,070,121 | A * | 5/2000 | Matsuda | B60T 8/172 340/995.22 |
| 6,269,308 | B1 * | 7/2001 | Kodaka | B62D 15/0265 340/435 |
| RE37,434 | E * | 11/2001 | Onari | B60K 31/0008 123/350 |
| 6,434,472 | B1 * | 8/2002 | Minowa | B60K 31/0008 477/115 |
| 7,015,805 | B2 * | 3/2006 | Knoop | B60T 7/22 340/435 |
| 7,321,819 | B2 * | 1/2008 | Seki | B60K 31/0008 340/436 |
| 7,433,772 | B2 * | 10/2008 | Isaji | B60T 7/22 340/435 |
| 7,792,624 | B2 * | 9/2010 | Nakamura | G08G 1/161 340/437 |
| 9,132,839 | B1 * | 9/2015 | Tan | B60W 50/00 |
| 2001/0014845 | A1 * | 8/2001 | Minowa | A61B 3/032 701/84 |
| 2001/0018641 | A1 * | 8/2001 | Kodaka | B62D 15/0265 701/301 |
| 2003/0200016 | A1 * | 10/2003 | Spillane | B60G 17/0195 701/36 |
| 2004/0002803 | A1 * | 1/2004 | Lee | F16H 1/0213 701/59 |
| 2004/0014565 | A1 * | 1/2004 | Oshima | B60W 10/06 477/182 |
| 2004/0254729 | A1 * | 12/2004 | Browne | B60R 21/013 701/301 |
| 2005/0125134 | A1 * | 6/2005 | Iwatsuki | B60T 8/1755 701/70 |
| 2005/0162005 | A1 * | 7/2005 | Hool | B60T 17/04 303/9.62 |
| 2005/0187694 | A1 * | 8/2005 | Shiiba | B60W 10/115 701/70 |
| 2005/0218718 | A1 * | 10/2005 | Iwatsuki | B60T 8/1766 303/177 |
| 2006/0060399 | A1 * | 3/2006 | Tabata | B60K 6/442 180/65.23 |
| 2006/0064223 | A1 * | 3/2006 | Voss | B62K 25/04 701/52 |
| 2006/0190158 | A1 * | 8/2006 | Shiiba | B60K 31/0066 701/70 |
| 2006/0235598 | A1 * | 10/2006 | Kudo | B62D 15/026 701/96 |
| 2006/0287798 | A1 * | 12/2006 | Inoue | B60L 11/14 701/70 |
| 2007/0078584 | A1 * | 4/2007 | Nakamura | B60T 7/22 701/93 |
| 2007/0191997 | A1 * | 8/2007 | Isaji | B60T 7/22 701/1 |
| 2007/0219695 | A1 * | 9/2007 | Chiu | B60W 30/08 701/51 |
| 2007/0282499 | A1 * | 12/2007 | Maeda | B60T 7/22 701/41 |
| 2007/0288133 | A1 * | 12/2007 | Nishira | G05D 1/0214 701/23 |
| 2008/0114511 | A1 * | 5/2008 | Sakugawa | B60T 8/1755 701/41 |
| 2008/0150352 | A1 * | 6/2008 | Nakamura | B60T 1/10 303/20 |
| 2008/0243335 | A1 * | 10/2008 | Rao | B60C 23/0408 701/38 |
| 2009/0037062 | A1 * | 2/2009 | Lee | B60W 30/045 701/70 |
| 2011/0031804 | A1 * | 2/2011 | Shimada | B60T 8/266 303/2 |
| 2012/0089311 | A1 * | 4/2012 | Burnett | B60T 7/042 701/70 |
| 2013/0030676 | A1 * | 1/2013 | Iriyama | F02D 29/02 701/110 |
| 2013/0244831 | A1 * | 9/2013 | Hiasa | F16H 61/04 477/79 |
| 2014/0244127 | A1 * | 8/2014 | Strengert | B60T 1/10 701/70 |
| 2014/0309882 | A1 * | 10/2014 | Antchak | F02B 67/06 701/36 |
| 2015/0081170 | A1 * | 3/2015 | Kikuchi | B60G 17/018 701/37 |
| 2015/0239442 | A1 * | 8/2015 | Yamakado | B60L 3/102 701/70 |
| 2015/0353090 | A1 * | 12/2015 | Yoshino | B60W 10/04 701/54 |
| 2016/0009291 | A1 * | 1/2016 | Pallett | B60W 50/082 701/23 |
| 2016/0194002 | A1 * | 7/2016 | Kelly | B60W 50/14 701/22 |
| 2016/0244039 | A1 * | 8/2016 | Rizzo | B60T 8/322 |
| 2016/0244057 | A1 * | 8/2016 | Kelly | B60W 30/143 |
| 2018/0029611 | A1 * | 2/2018 | Gage | B60W 50/14 |
| 2018/0043867 | A1 * | 2/2018 | Lemmer | B60T 7/102 |

* cited by examiner vehicle network environment 201 vehicle control unit 200 vehicle control unit 200

| | deceleration control signals 203 | | | | | |
|---|---|---|---|---|---|---|
| selected vehicle driving mode 207 | throttle control signal field 504 | grill shutter control signal field 506 | alternator load control signal field 508 | air conditioner compressor control signal field 510 | transmission lock-up control signal field 512 |
| ECO mode 514 | ECO_state_504a | ECO_state_506a | ECO_state_508a | ECO_state_510a | ECO_state_512a |
| normal mode 516 | norm_state_504b | norm_state_506b | norm_state_508b | norm_state_510b | norm_state_512b |
| sport mode 518 | sport_state_504c | sport_state_506c | sport_state_508c | sport_state_510c | sport_state_512c |
| ○○○ | ○○○ | ○○○ | ○○○ | ○○○ | ○○○ |
| x-mode nnn | x_state_504nnn | x_state_506nnn | x_state_508nnn | x_state_510nnn | x_state_512nnn |

FIG. 5A
mode deceleration target deceleration table 500

| mode 207 == ECO mode 514 | mode 207 == normal mode 516 | mode 207 == sport mode 514 |
|---|---|---|
| ECO_state_504a == OPEN | norm_state_504b == CLOSED | sport_state_504c == CLOSED |
| ECO_state_506a == CLOSED | norm_state_506b == CLOSED | sport_state_506c == OPEN |
| ECO_state_508a == LOW | norm_state_508b == MID | sport_state_508c == HIGH |
| ECO_state_510a == OFF | norm_state_510b == driver_operated (OFF | ON) | sport_state_510c == ON |
| ECO_state_512a == FLEX | norm_state_512b == FULL | FLEX | sport_state_512c == FULL |

FIG. 5B deceleration targets 600

CONTROLLED VEHICLE DECELERATION BASED ON A SELECTED VEHICLE DRIVING MODE

BACKGROUND

Vehicle operators and/or drivers have had a driving mode selection for their vehicles. The driving mode selection affects a transportation quality imparted to the vehicle occupants. For example, a comfort driving mode has had a target of a soft and smooth transport by placing suspension at a soft setting, and changing gears earlier to eliminate high revolutions, etc., to limit acceleration forces on the vehicle occupants. On the other end, a sport driving mode has had a target of a sporty transport, placing suspension at a stiff setting, with less body roll, higher engine revolutions per gear changes, the throttle response is adjusted be eager and responsive when the accelerator is pressed, and less regard for limiting acceleration forces on the vehicle occupants in exchange for a more exhilarating ride. It is desirable, however, that a driving mode selection be applied to vehicle deceleration, to provide the occupants similar transportation experience when the vehicle is no longer under active acceleration and/or braking.

SUMMARY

A device and method for a controlled deceleration based on a selected vehicle driving mode are disclosed.

In one implementation, a method for controlled deceleration based on a selected vehicle driving mode is disclosed. The method includes sensing a deceleration of a vehicle, and producing, in response, a plurality of deceleration control signals based on a deceleration target for the selected vehicle driving mode. The selected vehicle driving mode includes one of a plurality of vehicle driving modes available for vehicle operation. At least one of the plurality of deceleration control signals are transmitted to prompt a controlled deceleration of the vehicle to correspond with a deceleration target for the selected vehicle driving mode. The method receives sensor data relating to the deceleration of the vehicle, and compares at least some of the sensor data with the deceleration target to generate a deceleration feedback signal. The method provides for adjusting the plurality of deceleration control signals based on the deceleration feedback signal to effect the controlled deceleration.

In another implementation, a vehicle control unit is disclosed. The vehicle control unit includes a wireless communication interface to service communication with a vehicle network, a processor coupled to the wireless communication interface, the processor for controlling operations of the vehicle control unit, and a memory coupled to the processor, the memory for storing data and program instructions used by the processor. The processor being configured to execute instructions stored in the memory to sense a vehicle deceleration, and produce, in response, a plurality of deceleration control signals based on a deceleration target for a selected vehicle driving mode. The selected vehicle driving mode includes one of a plurality of vehicle driving modes. The processor transmits, via the wireless network interface, at least one of the plurality of deceleration control signals to prompt a controlled vehicle deceleration to correspond with a deceleration target for the selected vehicle driving mode. The processor receives, via the wireless network interface, sensor data relating to the vehicle deceleration, and compares at least some of the sensor data with the deceleration target to generate a deceleration feedback signal. The processor is configured to adjust the plurality of deceleration control signals based on the deceleration feedback signal to effect the controlled vehicle deceleration.

BRIEF DESCRIPTION OF THE DRAWINGS

The description makes reference to the accompanying drawings wherein like reference numerals refer to like parts throughout the several views, and wherein:

FIGS. 5A and 5B provide examples of deceleration control signals for a controlled deceleration based on a selected vehicle driving mode;

DETAILED DESCRIPTION

Vehicle mode-based controlled deceleration in an autonomous, driver-assist, or manually operated vehicle (petroleum fueled, electric fueled, hybrid, etc.) is described herein. One example method provides that upon sensing a deceleration of a vehicle, producing, in response, a plurality of deceleration control signals based on a deceleration target for the selected vehicle driving mode. The method transmits at least one of the plurality of deceleration control signals to prompt the controlled deceleration of the vehicle to correspond with a deceleration target for the selected vehicle driving mode. To refine the controlled deceleration, the method further includes receiving sensor data relating to the deceleration of the vehicle, and comparing at least some of the sensor data with the deceleration target to generate a deceleration feedback signal. Based on the deceleration feedback signal, the method provides for adjusting the plurality of deceleration control signals to effect the controlled deceleration.

Figure 1:
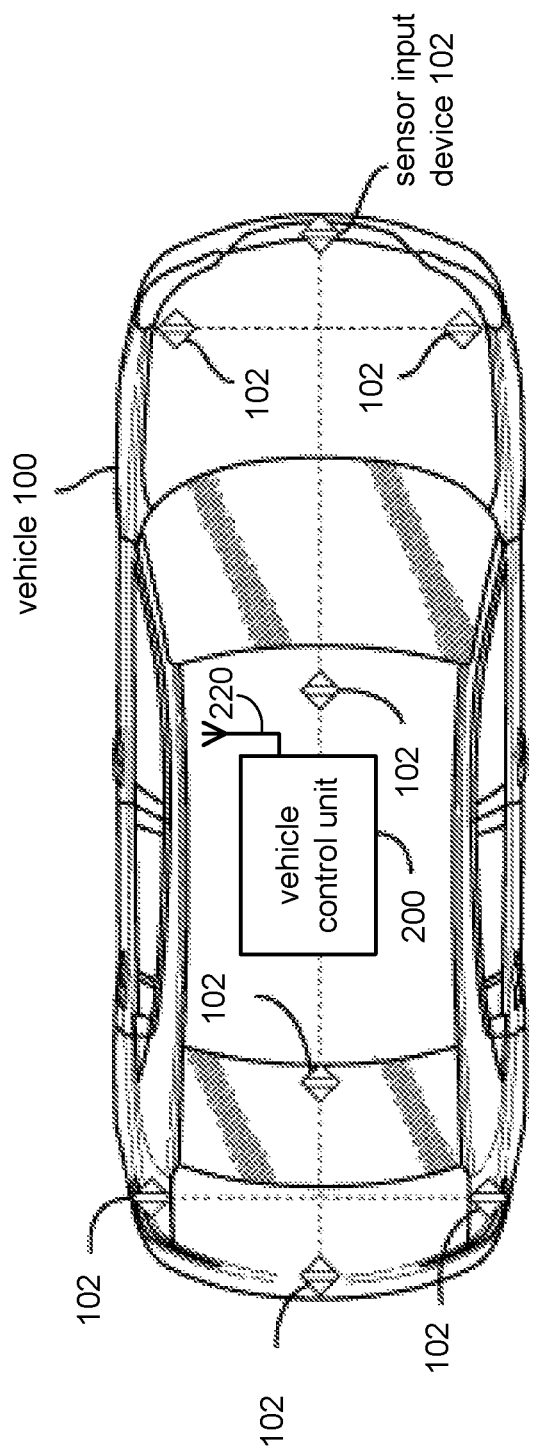
FIG. 1 is an illustration top view of a vehicle including a vehicle control unit.

In this regard, various modes of a vehicle may apply to provide a controlled deceleration, providing G-force profiles in-line with a selected vehicle driving mode. Accordingly, by way of example, a sport mode a controlled deceleration may be "sporty-in-nature," with a stiff ride, more dynamic forces, etc. In an eco mode, on a controlled deceleration, the engine, transmission and climate control are altered to provide improved fuel economy, as well as a gentler G-force profile experience to the vehicle operator. FIG. 1 is a schematic illustration of a vehicle 100 including a vehicle control unit 200. A plurality of sensor input devices 102 are in communication with the control unit 200.

The plurality of sensor input devices 102 can be positioned on the outer surface of the vehicle 100, or may be positioned in a concealed fashion for aesthetic purposes with regard to the vehicle. Moreover, the sensor devices may operate at frequencies in which the vehicle body or portions thereof appear transparent to the respective sensor device.

Communication between the sensor devices may be on a bus basis, and may also be used or operated by other systems of the vehicle 100. For example, the sensor input devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100. Moreover, the sensor input devices 102 may be further coupled to the vehicle control unit 200 via such communication-system architectures.

The sensor input devices 102 operate to monitor ambient conditions relating to the vehicle 100, including audio, visual, and tactile changes to the vehicle environment.

One or more of the sensor input devices 102 can be configured to capture changes in velocity, acceleration, and/or distance to these objects in the ambient conditions of the vehicle 100, as well as an angle of approach. The sensor input devices 102 may be provided by a Light Detection and Ranging (LIDAR) system, in which the sensor input devices 102 may capture data related to laser light returns from physical objects in the environment of the vehicle 100. The sensor input devices 102 may also include a combination of lasers (LIDAR) and milliwave radar devices.

In various driving modes, such as autonomous, driver-assist, and/or manual, the examples of the placement of the sensor input devices 102 may provide for blind-spot visual sensing (such as for another vehicle adjacent the vehicle 100) relative to the vehicle user, and for forward periphery visual sensing (such as for objects outside the forward view of a vehicle operator, such as a pedestrian, cyclist, etc.).

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode of operation, a computing device, which may be provided by the vehicle control unit 200, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device.

For example, the vehicle operator can control certain aspects of the vehicle operation, such as steering angle, while the vehicle control unit 200 can control other aspects of the vehicle operation, such as braking and acceleration. When the vehicle 100 is operating in autonomous (or driver-assist) mode, the computing device, such as the vehicle control unit 200, issues commands to the various vehicle systems to direct their operation, rather than such vehicle systems being controlled by the vehicle user.

As shown in FIG. 1, the vehicle control unit 200 is configured to provide wireless communication with a user device through the antenna 220, other vehicles (vehicle-to-vehicle), and/or infrastructure (vehicle-to-infrastructure), or with devices through a network cloud, which is discussed in detail with respect to FIGS. 2-7.

Moreover, the vehicle control unit 200 may provide controlled deceleration based on a selected vehicle driving mode, such as sport, economy, normal, etc. As may be appreciated, the sensor input device 102 may provide relational vehicle speed sensor data to gauge a vehicle deceleration, and to provide feedback with regard to a deceleration target.

Figure 2:
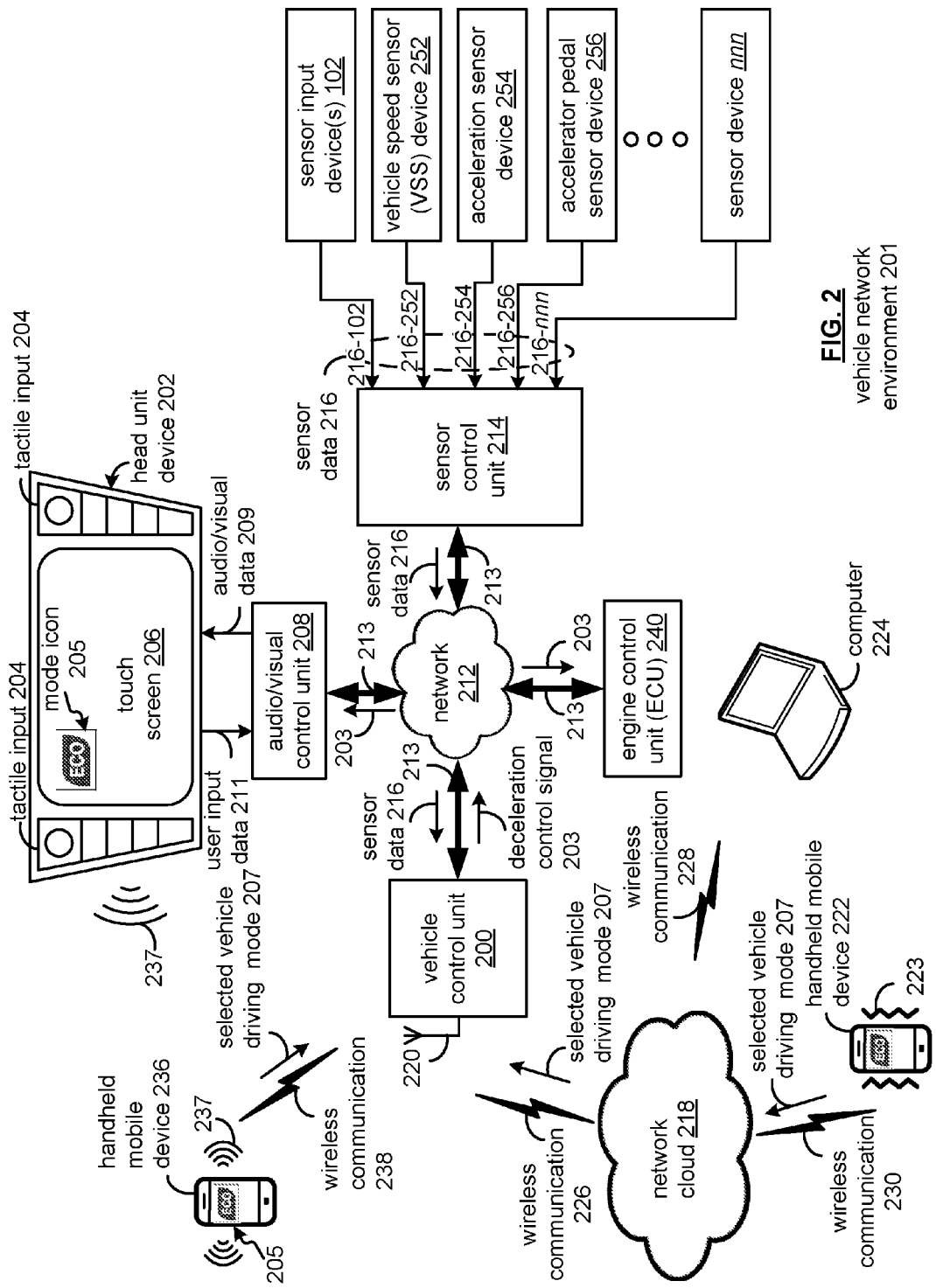
FIG. 2 shows a block diagram of the vehicle control unit of FIG. 1 in the context of a network environment.

Referring now to FIG. 2, a block diagram of the vehicle control unit 200 in the context of a network environment 201 is provided. While the vehicle control unit 200 is depicted in abstract with other vehicular components, the vehicle control unit 200 may be combined with the system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in FIG. 2, a vehicle network environment 201 may include the vehicle control unit 200, an audio/visual control unit 208, a sensor control unit 214, and an engine control unit 240, that are communicatively coupled via a network 212 and communication paths 213.

The vehicle control unit 200 may communicate with a head unit device 202 via a communication path 213 and network 212, and may also communicate with the sensor control unit 214 to access sensor data 216 from sensor devices 102, 252, 254, 256 and/or nnn. The vehicle control unit 200 may also be wirelessly coupled with a network cloud 218 via the antenna 220 and wireless communication 226, as well as via a wireless communication 238 to handheld user devices such as handheld mobile device 236 (for example, cell phone, a smart phone, a personal digital assistant (PDA) devices, tablet computer, e-readers, etc.).

In this manner, the vehicle control unit 200 operates to receive input data, such as sensor data 216, and provide data, to the head unit device 202 via the audio/visual control unit 208, to the sensor control unit 214, and to other devices that may communicatively couple via the network 218, such as computer 224, mobile handheld device 222 (for example, cell phone, a smart phone, a personal digital assistant (PDA) devices, tablet computer, e-readers, etc.).

The vehicle control unit 200 and the audio/visual control unit 208 may be communicatively coupled to receive the sensor data 216 from the sensor control unit 214, including data values relating to fuel consumption information.

The vehicle control unit 200 may provide data such as a deceleration control signal 203 to prompt a controlled deceleration of the vehicle 100 based on a deceleration target for a selected vehicle driving mode 207. The deceleration control signal 203 may be announced by example by displaying a visual indicator 205 (such as eco icon, sport icon, normal icon, etc.), by providing a haptic indication 223, and/or by providing an audible indication 237 to the vehicle operator. The visual indicator 205, haptic indication 223, and/or audible indication 237 may be provided via the head unit device 202, handheld mobile devices 222 and/or 236, computer 224, a combination of devices thereof, etc. As may also be appreciated, the visual indicator 205 may be provided via a conventional instrument cluster assembly of the vehicle 100 to the vehicle operator, such as by an indicator light (LED, LCD, backlit, etc.), graphic icon, etc. An example of such a visual indicator 205 is an "eco driving indicator light" that illuminates during eco-friendly operation, a sport driving indicator light that illuminates during sport driving operation, etc.

As discussed in detail herein, the vehicle control unit 200, upon sensing a deceleration of the vehicle 100, operates to produce deceleration control signals 203 based on a deceleration target for the selected vehicle driving mode 207, which is discussed in detail with reference to FIGS. 4-7.

Still referring to FIG. 2, the audio/visual control unit 208 operates to provide, for example, audio/visual data 209 for display to the touch screen 206, as well as to receive user input data 211 via a graphic user interface presented by the touch screen 206. The audio/visual data 209 and input data 211 may include audio data, hands-free phone data, voice control data, navigation data, USB connection data, DVD play function data, multifunction meter function data, illumination signal data for the touch screen 206 (such as dimming control), driving status recognition data (such as vehicle speed, reverse, etc. via sensor data 216), composite image signal data (such as data via sensor input device 102), etc.

In FIG. 2, the head unit device 202 may include tactile input 204 and a touch screen 206. The touch screen 206 operates to provide visual output or graphic user interfaces such as, for example, maps, navigation, entertainment, information, infotainment, and/or combinations thereof.

The touch screen 206 may include mediums capable of transmitting an optical and/or visual output such as, for example, a cathode ray tube, light emitting diodes, a liquid crystal display, a plasma display, or other two dimensional or three dimensional display that displays graphics, text or video in either monochrome or color in response to display data 209.

Moreover, the touch screen 206 may, in addition to providing visual information, detect the presence and location of a tactile input upon a surface of or adjacent to the display. Additionally, it is noted that the touch screen 206 can include at least one or more processors and one or more memory modules to support the operations described herein.

The head unit device 202 may also include tactile input and/or control inputs such that the communication path 213 communicatively couples the tactile input to other control units and/or modules 214, 240, etc., of the vehicle 100 (FIG. 1). The user input data 211 may be provided by tactile devices capable of transforming mechanical, optical, or electrical signals into a data signal capable of being transmitted via the communication path 213.

The tactile input 204 may include a number of movable objects that each transform physical motion into a data signal that can be transmitted over the communication path 213 such as, for example, a button, a switch, a knob, a microphone, etc.

The touch screen 206 and the tactile input 204 may be combined as a single module, and may operate as an audio head unit or an infotainment system of the vehicle 100. The touch screen 206 and the tactile input 204 can be separate from one another and operate as a single module by exchanging signals via the communication path 213 via audio/visual data 209 and/or user input data 211.

The head unit device 202 may provide information regarding vehicle operation conditions based on display data 209 from the audio/visual control unit 208. Moreover, the graphics-based instrument cluster display may provide an instrument cluster display to other monitor devices for the vehicle 100, such as a heads-up display (not shown), or to an instrument cluster in the vehicle dash assembly behind the vehicle steering wheel.

The audio/visual control unit 208 operates to receive user input data 211, and provides display data 209. The display data 209 may include operational information based on the sensor data 216. For example, the graphic user interface presented to the touch screen 206 may include a graphic mapping of sensor data relating to a controlled deceleration, such as sensor data 216-252, 216-254, etc., against a deceleration target.

The sensor control unit 214 provides access to sensor data 216-102 of the sensor input device 102, to sensor data 216-262 of the vehicle speed sensor (VSS) device 252, to sensor data 216-254 of the acceleration sensor device 254, sensor data 216-256 of the accelerator pedal sensor device 256, 216-$nnn$ of the sensor device nnn, etc.

The VSS device 252 operates to measure transmission/transaxle output and/or wheel speed to produce instantaneous velocity data 216-252. The VSS device 252 provides this information to modify engine functions, such as ignition timing, transmission shift points, etc. The VSS device 252 may further operate to provide velocity data 216-252 to the vehicle control unit 200, which may be sampled at a sample rate during a decrease in a velocity rate over time to produce sampled velocity data.

Generally, speed or velocity is the distance traveled divided by the time it takes. For example, when a distance of 200 kilometers (124 miles) takes four hours to do so, the average speed is 50 kilometers per hour (31 mph).

With respect to sensing instantaneous velocity, the VSS device 252 may be, for example, based upon magnetic components on a rotating drive shaft that are detected by magnetic sensor devices (for example, reed switches, Hall-effect sensors, etc.). Each pass generates a brief electric current pulse. The sensor control unit 214 may operate to count the rate the current pulses arrive and converts the signal into velocity data, which may be displayed by an instrument cluster. The vehicle control unit 200 samples the velocity data 216-252 to assess the nature of an acceleration rate (increasing or decreasing (that is, deceleration)).

The accelerometer sensor device 204 operates to sense deceleration of the vehicle 100 in terms of G-force. Changes in G-force may indicate a decrease in the velocity rate over time. As may be appreciated, accelerometers generally operate to sense a change in force, based on the principle of force equals mass times acceleration.

Accordingly, with respect to the embodiments discussed herein, the accelerometer sensor device 254 may be used to sense general force changes to the vehicle 100, and to provide a point and/or event to begin monitoring a vehicle's instantaneous velocity to provide feedback to affect the nature of the controlled deceleration applied.

For example, while at a stop (where velocity is zero) or at constant speed (when velocity is generally unchanged over time), the acceleration sensor device 204 senses a zero g-force. When decrease in a velocity rate over time occurs, however, the acceleration sensor device 254 senses a non-zero, negative G-force. In this regard, the acceleration sensor device 254 provides sensor data 216-254 for the vehicle control unit 200 to receive feedback relating to deceleration of the vehicle to adjust the deceleration control signals 203 to effect a controlled deceleration based on the selected vehicle driving mode 207.

The acceleration sensor device 254 may be implemented, for example, as a capacitive accelerometer, a piezoelectric accelerometer, a semiconductor accelerometer, a Hall-effect accelerometer, etc. Generally, the acceleration sensor device 254 may be provided by a device capable of sensing forces (that is, force equals mass times acceleration) exerted on the vehicle 100 by a change in acceleration (such as a deceleration in moving from a first velocity to a second, lower, velocity, etc.).

The sensor data 216 may also operate to permit object detection external to the vehicle, such as for example, other vehicles (including vehicles occupying a parking location), roadway obstacles, traffic signals, signs, trees, etc. Accordingly, the sensor data 216 allows the vehicle 100 (see FIG. 1) to assess its environment in order to maximize safety for vehicle passengers and objects and/or people in the environment.

The engine control unit (ECU) 240 may communicate with a head unit device 202 via a communication path 213 and network 212, and may also communicate with the sensor control unit 214 to access sensor data 216 from sensor devices 102, 252, 254, 256, and/or nnn.

The engine control unit 240 may function to control internal combustion engine actuators to obtain a desired engine performance. The engine control unit 240 operates to receive deceleration control signals 203 to produce a controlled deceleration of the vehicle 100.

For example, desired engine performance may be based on operational modes, including an economy mode (for improved fuel economy), a sport mode (sporty in nature), a Sport Plus mode (for even sportier performance by disengaging traction control, stability control, etc.), a normal mode (balance between comfort and sport), comfort mode (for a softest and smoothest drive), etc. The deceleration control signal 203 may be implemented by the engine control unit 240 to also produce a controlled deceleration based on a deceleration target for a selected vehicle driving mode 207, as is discussed in detail with reference to FIGS. 4-7.

As may be appreciated, the communication path 213 of the vehicle network environment 201 may be formed by a medium suitable for transmitting a signal such as, for example, conductive wires, conductive traces, optical waveguides, or the like. Moreover, the communication paths 213 can be formed from a combination of mediums capable of transmitting signals.

The communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

As may be further appreciated, the communication path 213 may be provided under other network specifications, such as automotive Ethernet developed under the IEEE 802.3, 802.1 and 1722 working groups, and as may also include audio video bridging over Ethernet (AVB), under IEEE 802.1Qat (Stream Reservation Protocol (SRP), IEEE 802.1Qav (Qav Queuing and Forwarding Protocol), etc.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The wireless communication 226, 228 and/or 230 of the network cloud 218 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As is noted above, the vehicle control unit 200 may be communicatively coupled to a computer 224 via wireless communication 228, a handheld mobile device 222 via wireless communication 230, etc. Application data may be provided to the vehicle control unit 200 from various applications running and/or executing on wireless platforms of the computer 224, the handheld mobile device 222 and 236, as well as from the head unit device 202 via the network 212.

The handheld mobile device 222 and/or computer 224, by way of example, may be a device including hardware (for example, chipsets, processors, memory, etc.) for communicatively coupling with the network cloud 218, and also include an antenna for communicating over one or more of the wireless computer networks described herein.

Figure 3:
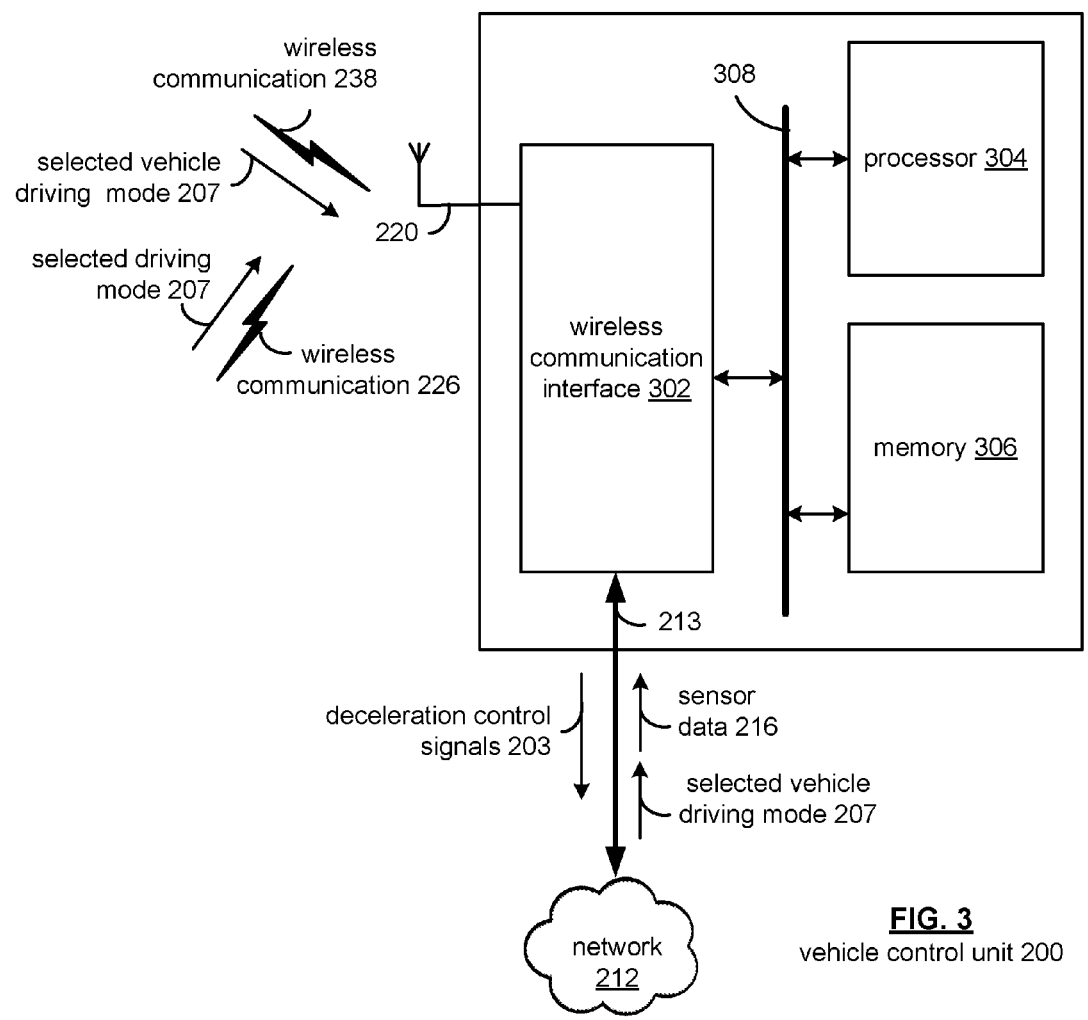
FIG. 3 is a block diagram of a vehicle control unit of FIG. 2.

FIG. 3 is a block diagram of a vehicle control unit 200, which includes a communication interface 302, a processor 304, and memory 306, that are communicatively coupled via a bus 308.

The processor 304 in the control unit 200 can be a conventional central processing unit or any other type of device, or multiple devices, capable of manipulating or processing information. As may be appreciated, processor 304 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 306 may be a single memory device, a plurality of memory devices, and/or embedded circuitry of the processor 304. Such a memory device may be a read-only memory, random access memory, volatile memory, non-volatile memory, static memory, dynamic memory, flash memory, cache memory, and/or any device that stores digital information. The memory 306 is capable of storing machine readable instructions such that the machine readable instructions can be accessed by the processor 304. The machine readable instructions can comprise logic or algorithm(s) written in programming languages, and generations thereof, (e.g., 1GL, 2GL, 3GL, 4GL, or 5GL) such as, for example, machine language that may be directly executed by the processor 304, or assembly language, object-oriented programming (OOP), scripting languages, microcode, etc., that may be compiled or assembled into machine readable instructions and stored on the memory 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 304 includes more than one processing device, the processing devices may be centrally located (e.g., directly coupled together via a wired and/or wireless bus structure) or may be distributed (e.g., cloud computing via indirect coupling via a local area network and/or a wide area network). Further note that when the processor 304 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 304 executes, hard coded and/or operational instructions corresponding to at least some of the steps and/or functions illustrated in FIGS. 1-7 to assess a nature of a vehicle deceleration and to provide near real-time feedback features and methods described herein.

The wireless communications interface 302 generally governs and manages the vehicle user input data via the network 212 over the communication path 213 and/or wireless communication 226. The communication interface 302 also manages controller unit output data such as display data and/or parking status data to the vehicle user. There is no restriction on the present disclosure operating on any particular hardware arrangement and therefore the basic features herein may be substituted, removed, added to, or otherwise modified for improved hardware and/or firmware arrangements as they may develop.

The sensor data 216 includes capturing of intensity or reflectivity returns of the environment surrounding the vehicle, instantaneous vehicle speed data, and acceleration data for determining acceleration state for providing feedback to the deceleration control signals 203 to correspond a controlled deceleration to a target deceleration for the selected vehicle driving mode 207. In general, data 216-102, 216-252,-216-254, 216-256,-nnn , captured by the sensor devices 102, 252, 254, 256 and/or nnn and provided to the vehicle network 212 via the communication path 213, can be used by one or more of applications of the vehicle 100 to assess acceleration and/or deceleration state(s) of the vehicle 100.

The antenna 220, with the wireless communications interface 302, operates to provide wireless communications with the vehicle control unit 200, including wireless communication 226.

Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

Figure 4:
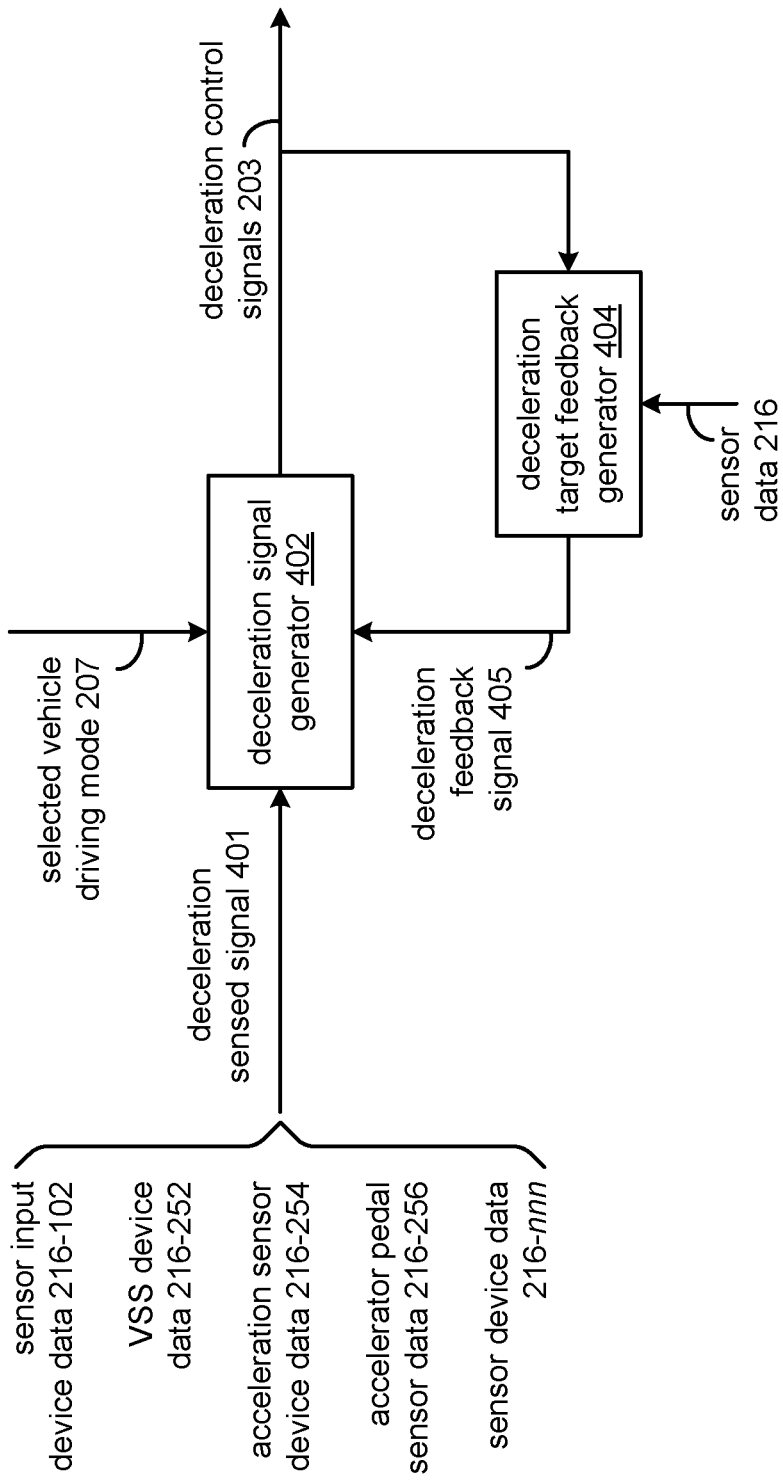
FIG. 4 shows a functional block diagram of the vehicle control unit of FIG. 1 for generating deceleration control signals.

FIG. 4 shows a functional block diagram of the vehicle control unit 200 that may include a deceleration signal generation 402 and a deceleration target feedback generator 404.

The deceleration signal generator 402 operates to receive a deceleration sensed signal 401, which may be provided by sensor devices of the vehicle 100 (see FIGS. 1 and 2). The deceleration sensed signal 401 maybe be provided and/or based on sensor input device data 216-102, VSS device data 216-252, acceleration sensor device data 216-254, accelerator pedal sensor data 216-256, sensor device data 216-nnn , or a combination thereof. For example, a release of an accelerator pedal by a vehicle operator, or by an analogous operation, by the vehicle when in an autonomous, a driver-assisted, or even a cruise control operation, affects a vehicle powertrain and subsequent deceleration of the vehicle.

As a further example of confirming an acceleration, the accelerator pedal sensor data 216-256 may register an accelerator-off value. To confirm and/or validate deceleration, another sensor data source may be polled. For example, a corresponding acceleration change may be detected and conveyed via the acceleration sensor device data 216-254, which may operate to confirm the deceleration effected by the release of an accelerator pedal by a vehicle operator and/or analogous autonomous device component.

Generally, a vehicle powertrain, as the term is used herein, may describe vehicle components that generate power and deliver power to the road surface, water, or air. The powertrain may include the engine, transmission, drive shafts, differentials, and the final drive communicating the power to motion (for example, drive wheels, continuous track as in military tanks or caterpillar tractors, propeller, etc.). The powertrain may also relate to other vehicle components such as environmental controls relating to heating, air-conditioning, passenger comfort, etc. The other components contribute to overall power consumption, and affect powertrain operation to either provide and/or retain power otherwise provided to these other vehicle components.

The deceleration signal generator 402 generates the deceleration control signals 203, which may be provided to various powertrain control units via the network 212, such as, for example, the engine control unit (ECU) 240 as actuator control data directed to vehicle components. The deceleration control signals 203 may indicate singular vehicle-device control (such as throttle control, etc.), partial vehicle-device control (such as combinations of throttle control, alternator load control, air conditioner compressor control, transmission control, etc.), and/or total vehicle-device control (such devices within a vehicle powertrain, environmental control, etc.).

The deceleration control signals 203 operate to provide a controlled deceleration based on the selected vehicle driving mode 207.

The controlled deceleration relates to non-braking controls, that in turn translate to a desired G-force (or gravitational force) experienced by a vehicle occupant during the deceleration. In general, without a controlled deceleration, different engine components contribute to the deceleration, and may produce inconsistent and/or random G-forces.

Gravitational forces (G-forces), as may be appreciated, refer to the force experienced on an occupant's body (as well as on the vehicle), and contributed to a vehicle ride experience. A G-force of one (1) G is the amount of force the Earth's gravitational field exerts while stationary on the ground—the sensation is that the planet tugs a person downward. For contrast, a five (5) G acceleration being five times as intense (such as in auto racing, roller coasters, etc.). When a vehicle changes a velocity rate faster than gravity (that is, $9.8 \text{ m/s}^2$), the forces experienced will be greater than one (1) G. At zero G, a passenger and/or occupant may feel weightless. Accordingly, when a vehicle (such as a car, boat, plane, etc.) changes its velocity by speeding up, slowing down, turning, etc., the vehicle velocity changes. The quicker it happens, the more force may be experienced by the vehicle occupants and/or vehicle operator.

The deceleration target feedback generator 404 may operate to provide feedback with respect to a deceleration target. The deceleration target feedback generator 404 receives deceleration control signals 203 and sensor data 216. The sensor data 216 operates to provide near real-time operational data of the vehicle 100. The sensor data 216 in effect provides an operational result of the deceleration control signals 203, and is compared with a deceleration target relating to the selected vehicle driving mode 207 to generate a deceleration feedback signal 405. The deceleration signal generator 402 may adjust the deceleration control signals 203 based on the deceleration feedback signal 405 to effect the controlled deceleration of the vehicle 100.

The use of the term "near real-time" or NRT, in the context of sensor data 216, refers to time delay that may be introduced, by the vehicle control unit 200 processing velocity data from the VSS device 252, and/or time delay that may be introduced by transmission of the velocity data over the vehicle network 212, and transmission of the feedback signal 203, etc., between the occurrence of an event (that is, sensing instantaneous velocity of the vehicle), and the use of feedback signal 405 by the deceleration signal generator 402.

FIGS. 5A and 5B are examples relating to deceleration control signals 203 with respect to the selected vehicle driving mode 207.

FIG. 5A illustrates a mode deceleration target table 500. The table 500 may be accessed by the vehicle control unit 200, such as by the deceleration signal generator 402, to produce deceleration control signals 203 based on a deceleration target relating to a selected vehicle driving mode 207. In the example of FIG. 5A, the selected vehicle driving mode 207 may include an ECO mode 514, a normal mode 516, a sport mode 518, through an x-mode nnn. As may be appreciated, additional modes may be provided, each having an associated deceleration target.

Vehicle component and/or actuator devices may be associated with the selected vehicle driving mode 207. In the example provided, the vehicle component and/or actuator devices are illustrated as similar with respect to each mode. However, as may be appreciated, other vehicle component and/or actuator devices may be included or removed depending on the respective mode presented for selection by a vehicle user and/or occupant.

In the example of FIG. 5A, the deceleration control signals 203 may include a throttle control signal field 504, a grill shutter control signal field 506, an alternator load control signal field 508, an air conditioner compressor control signal field 510, and a transmission lock-up control signal field 512. The respective control signals relate to vehicle power consumption values, and for ease of reference control signals designations may refer to the nomenclature of the corresponding fields. For example, a throttle control signal may be referred to as throttle control signal 504, a grille shutter control signal as grill shutter control signal 506, etc. The values may be provided by the corresponding signals for selected vehicle driving mode 207. Corresponding the respective control signal to a desired power effect to a deceleration target serves to facilitate deceleration within a given selected vehicle driving mode 207.

The throttle control signal field 504 relates to a throttle control system, which may sense an accelerator pedal module position, and may operate a throttle valve that may be opened and closed by an electric motor, based on a throttle position operation by the engine control unit 240, for example. The throttle position may be further determined, as appreciated by one of skill in that art, other vehicle sensor devices, such as the accelerator sensor device 256, an engine speed sensor, VSS sensor device 252, cruise control switches, etc.

The grill shutter control signal field 506 relates to air flow control to the radiator and engine compartment of the vehicle 100. The function provided is to promote engine cooling. When the grill shutters are closed, a corresponding effect is lessening aerodynamic drag and reducing fuel consumption.

The alternator load control signal field 506 relates to the engine power consumed by the alternator to power a vehicle's electric loads. As an example of the correlation, an engine drops in revolutions-per-minute at low velocities due to the engine power that may be used by the alternator to power the electric load, and without regard to a mechanical load placed on a running engine.

The air conditioner compressor control signal field 510 relates to the electric load placed on the engine to operate the air-conditioning system for passenger and/or occupant comfort. When the compressor is engaged or on, a load is placed on the engine to control the air temperature within the vehicle.

The transmission lock-up control signal 512 relates to fuel economy, and affecting powertrain operation for vehicle deceleration. Flex lock-up control allows the clutch in the torque converter to maintain a partially-engaged position, enhancing fuel efficiency and increasing the lock-up clutch's operation range.

During deceleration for example, the powertrain control system (including the engine control unit 240, etc.), may decrease fuel in the fifth through eight gears to expand the vehicle speed range where fuel cut is enabled, and maintaining the fuel cut even during a coast down shift event. When the operator (or autonomous vehicle) releases the accelerator, the lock-up control response may be improved by reducing the time from "accelerator-off" sensor data to the start of the fuel cut being reduced by a second or more, and the vehicle rate of speed when fuel cut is canceled provides a resulting deceleration.

Generally, with an automatic transmission of the present example, when the clutch engages, a torque converter may be permitted to 'lock' the engine to the transmission input shaft, providing a direct engagement ratio between the engine and transmission to increase fuel economy. Operation of the transmission may be based on a clutch solenoid or the like.

As may be appreciated, automatic transmissions are not as fuel efficient as manual transmissions. When a vehicle's engine spins more slowly, slippage increases with a torque converter, and creates heat. Heat with a torque converter reduces fuel economy and can harm both the converter and the transmission. A lock-up at a fixed ratio (for example, a 1:1 ratio) eliminates the slippage, which reduces heat and improves fuel economy. In a flex lock-up, a clutch may be partially or fully engaged during deceleration. A flex lock-up may operate to reduce slippage in lower gears and a lower vehicle speed, to improve fuel economy and drivability. For deceleration, when the vehicle 100 reaches a predetermined speed, the clutch locks, adding to an effect of engine braking and reducing fuel consumption.

In operation, on sensing a deceleration of a vehicle 100, the vehicle control unit 200 produces the deceleration control signals 203, based on the fields and selected vehicle driving mode 207 of FIG. 5A. In this manner, a non-braking, coasting form of controlled deceleration may be achieved with the resulting G-force profile corresponding to the selected vehicle driving mode 207.

FIG. 5B is an example of deceleration control signals 203 that may be generated by a deceleration control signal generator 402 of the vehicle control unit 200, with the example of an ECO mode 514, normal mode 516, and sport mode 518. As may be appreciated, additional or fewer vehicle driving modes may be present with respect to the vehicle 100, as well as additional forms of vehicle driving modes not presented.

As shown by FIG. 5B, an example of the values for the deceleration control signals 203 for an ECO mode 514 may include:
 ECO_state_504*a*==OPEN
 ECO_state_506*a*==CLOSED
 ECO_state_508*a*==LOW
 ECO_state_510*a*==OFF
 ECO_state_512*a*==FLEX For a normal mode 516, an example of values for the deceleration control signals 203 may include:
 norm_state_504*b*==CLOSED
 norm_state_506*b*==CLOSED
 norm_state_508*b*==MID
 norm_state_510*b*==driver_operated (OFF|ON)
 norm_state_512*b*==FULL|FLEX And for a sport mode 514, an example of values for deceleration control signals 203 may include:
 sport_state_504*c*==CLOSED
 sport_state_506*c*==OPEN
 sport_state_508*c*==HIGH
 sport_state_510*c*==ON
 sport_state_512*c*==FULL The vehicle control unit 200 operates to transmit at least one of the plurality of deceleration control signals 203 to prompt a controlled deceleration of the vehicle 100 to correspond with a deceleration target 600 for the selected vehicle driving mode 207, which is discussed in detail with FIG. 6.

As may be appreciated, the deceleration control signals 203 may be provided and applied sequentially, in an order as set out by the example of FIG. 5B, or may be in another order based on the deceleration feedback signal 405 of FIG. 4, to provide a controlled deceleration based on a respective deceleration target 600.

As may be appreciated, the deceleration control signals 203, such as one of the plurality of deceleration control signals and at least one other of the of the plurality of deceleration control signals, may operate cumulatively to prompt a controlled deceleration of the vehicle 100 to correspond with the deceleration target for the selected vehicle driving mode.

Figure 6:
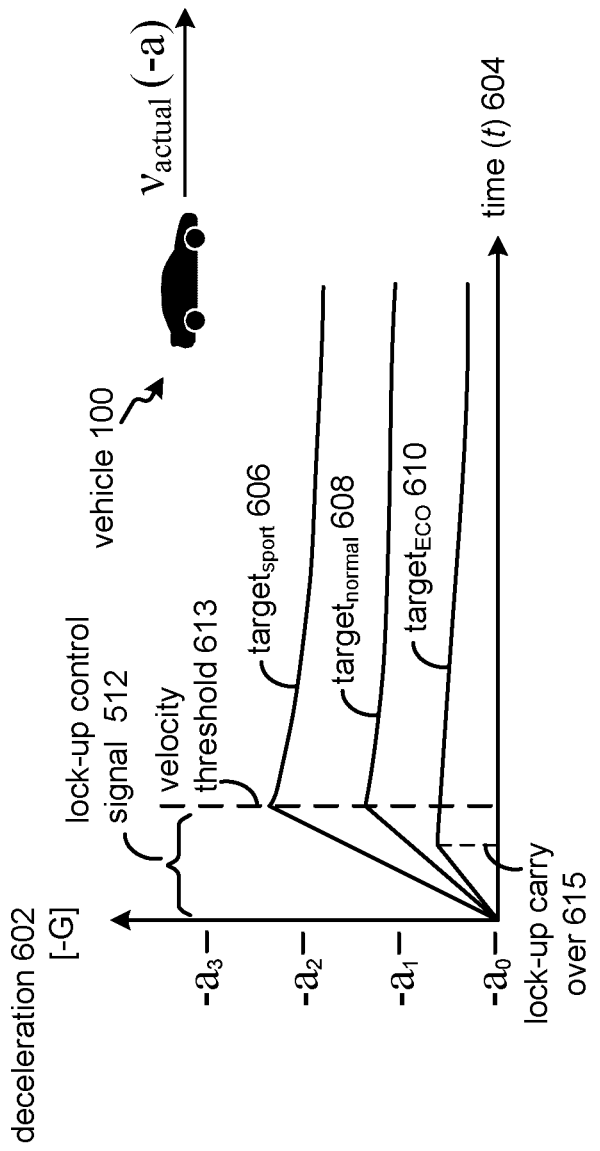
FIG. 6 is a graph depiction of example deceleration targets for several vehicle driving modes.

FIG. 6 illustrates graphing of deceleration targets 600 for a plurality of deceleration targets of respective selected vehicle driving modes 207. The graphing is based on an axis for deceleration 602 (and corresponding negative G-force) with respect to time (t) 604 with respect to a vehicle 100 with a negative velocity based on a negative acceleration (or deceleration).

The deceleration targets 600 may be based on modes for a vehicle 100, such as a target$_{sport}$ 606, a target$_{normal}$ 608, and a target$_{ECO}$ 610. In the nature of each state, the G-forces experienced are progressively less in magnitude, such as from target$_{sport}$ 606, a target$_{normal}$ 608, and to a target$_{ECO}$ 610. As may be appreciated, additional deceleration targets 600 may be implemented with respect to those presented and/or available to a vehicle operator, such as a tow mode, a sport plus mode, etc.

Generally, the lock-up control signal 512 relates to engine braking via the transmission. In lock-up, a clutch torque converter may be permitted to 'lock' the engine to the transmission input shaft, providing a direct engagement ratio between the engine and transmission to increase fuel economy. Upon reaching a velocity threshold 613, the lock-up control signal 512 releases. For example, the velocity threshold 613 may be a low velocity to permit further coasting on deceleration forces. With respect to target$_{ECO}$ 610, a lock-up carry-over effect 615 is provided via the lock-up control signal 512 before the velocity threshold 613. In this manner, the lock-up control signal 512 may contribute to the requisite deceleration, and further provides continued deceleration to the velocity threshold 613.

Subsequent to the lock-up control signal 512, deceleration control signals 203 (see, e.g., FIGS. 5A, 5B) may be applied in a sequential manner, a cumulative manner, and/or a combination thereof. A deceleration feedback signal 405 is generated based on sensor data 216 and compares the sensor data against the respective deceleration target 606, 608, and 610 of the present example. The deceleration target 600 used for an "ideal" or "objective" deceleration is correspondingly based on the selected vehicle driving mode 207. The deceleration feedback signal 405 is received by the deceleration signal generator 402 (see FIG. 4), and adjusts the deceleration control signals 203 to effect a controlled deceleration.

As may be appreciated, the deceleration targets 600 may conform to fuel economy targets, such as the EPA Federal Test Procedures (FTP-75) for city driving cycles.

Figure 7:
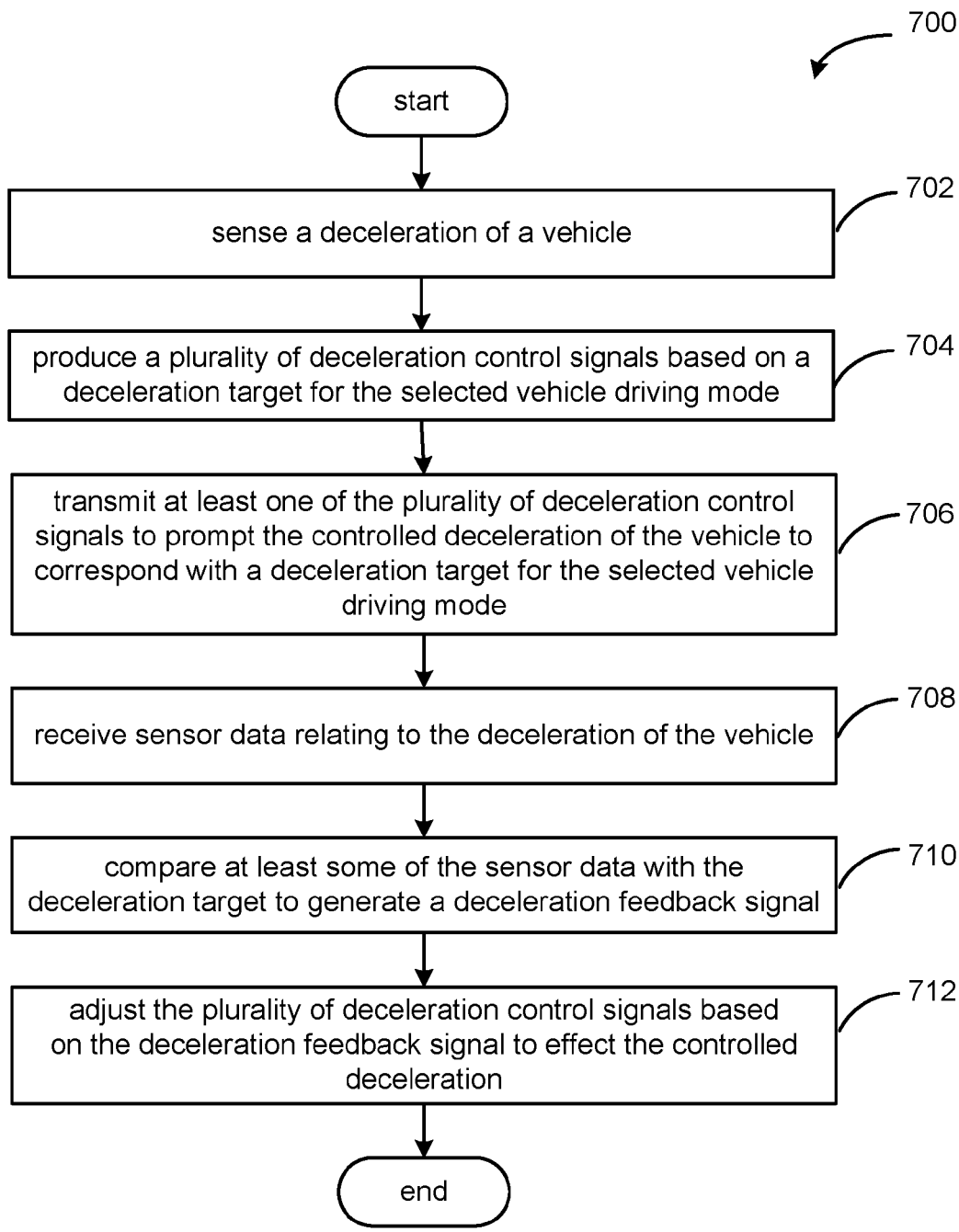
FIG. 7 shows an example process for controlled vehicle deceleration based on a selected vehicle driving mode.

FIG. 7 shows an example process 700 for controlled vehicle deceleration based on a selected vehicle driving mode 207.

At operation 702, a vehicle control unit may sense a deceleration of a vehicle. A deceleration may be based on one or many sensor devices of a vehicle 100. Examples may include a sensor input device data, a VSS device data, acceleration sensor device data, an accelerator pedal sensor data, and/or other sensor data relating to movement of the vehicle 100. For example, the accelerator pedal sensor device may indicate an accelerator off value. Also, the acceleration sensor device may indicate a change in acceleration (such as a deceleration) by sensing a change in force on the sensor. Such sensor devices may be provided, by example, as a capacitive accelerometer, a piezoelectric accelerometer, a semiconductor accelerometer, a Hall-effect accelerometer, etc.

At operation 704, a plurality of deceleration control signals are produced, which are based on a deceleration target for the selected vehicle driving mode. As may be appreciated, the selected vehicle driving mode is one of a plurality of vehicle driving modes, such as an Eco mode, a normal mode, a sport mode, a sport plus mode, a tow mode, etc. The deceleration control signals are transmitted, at operation 706, to prompt the controlled deceleration of a vehicle to correspond with a deceleration target for the selected vehicle driving mode. The control signals may be provided to various control units of a vehicle. The control signals may be provided as a group with timing spacing for each control unit of a vehicle (such as an engine control unit 240, a transmission control unit, powertrain control units, etc.) corresponding with the deceleration target. The control signals may be provided individually, and further transmitted based on a deceleration feedback control signal. Also, as may be appreciated, more than one deceleration control signal may be provided as well.

At operation 708, sensor data is received relating to the deceleration of the vehicle. The sensor data may relate to the movement of the vehicle, and indicate actual deceleration in view of the deceleration control signals. Examples of sensor data may include instantaneous vehicle speed sensor data generated by a vehicle speed sensor (VSS) device, relational vehicle speed sensor data based on operation of a sensor input device (such as LiDAR, milliwave sensor devices, etc.), acceleration data from an acceleration sensor device, etc.

At operation 710, at least some of the sensor data is compared with a deceleration target, based on a selected vehicle driving mode, to generate a deceleration feedback signal.

At operation 712, the plurality of deceleration control signals are adjusted based on the deceleration feedback signal to effect the controlled deceleration. As noted, further deceleration control signals may be provided to further affect the deceleration, or deceleration control signals may be removed if the deceleration (and associated G-forces) experienced by the vehicle and/or the passengers exceeds the target. Further, individual deceleration control signals may be adjusted, such as levels within a throttle control signal, a transmission lock-up control signal, etc. The adjustment of the transmission lock-up control signals may provide a modified controlled deceleration of the vehicle 100.

For example, the adjustment may include selecting at least one other of the plurality of deceleration control signals to prompt the controlled deceleration of the vehicle to correspond with the deceleration target for the selected vehicle driving mode. The at least one other of the plurality of deceleration control signals are transmitted to prompt the modified controlled deceleration of the vehicle.

For another example, at least one of the plurality of deceleration control signals and at least one other of the plurality of deceleration control signals operate to cumulatively prompt the controlled deceleration of the vehicle to correspond with the deceleration target for the selected vehicle driving mode, and/or the modified selected vehicle driving mode.

While particular combinations of various functions and features of the present invention have been expressly described herein, other possible combinations of these features and functions that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

The term "module," as it may be used in the description of the drawings, includes a functional block that is implemented in hardware, software, and/or firmware to perform one or more functions such as the processing of an input signal to produce an output signal. As used herein, a module may contain submodules that themselves are modules.

Thus, there has been described herein an apparatus and method, as well as several embodiments including a preferred embodiment, for implementing a controlled vehicle deceleration based on a selected vehicle driving mode.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for controlled deceleration based on a selected vehicle driving mode, the method comprising:
    sensing a deceleration of a vehicle;
    producing, in response, a plurality of deceleration control signals based on a deceleration target for the selected vehicle driving mode, wherein the selected vehicle driving mode is one of a plurality of vehicle driving modes;
    transmitting at least one of the plurality of deceleration control signals to prompt the controlled deceleration of the vehicle to correspond with a deceleration target for the selected vehicle driving mode;
    receiving sensor data relating to the deceleration of the vehicle;
    comparing at least some of the sensor data with the deceleration target to generate a deceleration feedback signal; and
    adjusting the plurality of deceleration control signals based on the deceleration feedback signal to effect the controlled deceleration.

2. The method of claim 1, wherein the sensing the deceleration of the vehicle comprises:
    receiving sensor data, via an accelerator sensor device, indicating an accelerator-off value for the vehicle.

3. The method of claim 1, wherein the plurality of deceleration control signals includes at least two of:
    a throttle control signal;
    a grill shutter control signal;
    an alternator load control signal;
    an air conditioner compressor control signal; and
    a transmission lock-up control signal.

4. The method of claim 1, wherein the sensor data comprises at least one of:
    instantaneous vehicle speed sensor data generated by a vehicle speed sensor device;
    relational vehicle speed sensor data based on operation of a sensor input device; and
    acceleration data from an acceleration sensor device.

5. The method of claim 4, wherein the acceleration sensor device comprises at least one of:
- a capacitive accelerometer;
- a piezoelectric accelerometer;
- a semiconductor accelerometer; and
- a Hall-effect accelerometer.

6. The method of claim 1, wherein the adjusting the plurality of deceleration control signals further comprises:
generating a set of the plurality of deceleration control signals based on the deceleration feedback signal to prompt a modified controlled deceleration.

7. The method of claim 1, wherein the adjusting the plurality of deceleration control signals further comprises:
selecting at least one other of the plurality of deceleration control signals to prompt the controlled deceleration of the vehicle to correspond with a deceleration target for the selected vehicle driving mode; and
transmitting the at least one other of the plurality of deceleration control signals.

8. The method of claim 7, wherein the at least one of the plurality of deceleration control signals and the at least one other of the plurality of deceleration control signals operate to sequentially prompt the controlled deceleration of the vehicle to correspond with the deceleration target for the selected vehicle driving mode.

9. The method of claim 7, wherein the at least one of the plurality of deceleration control signals and the at least one other of the plurality of deceleration control signals operate to cumulatively prompt the controlled deceleration of the vehicle to correspond with the deceleration target for the selected vehicle driving mode.

10. A method for controlled deceleration based on a selected vehicle driving mode, the method comprising:
sensing a deceleration of a vehicle;
producing, in response, a plurality of deceleration control signals based on a deceleration target for the selected vehicle driving mode, wherein the selected vehicle driving mode is one of a plurality of vehicle driving modes and at least one of the plurality of deceleration control signals prompts the controlled deceleration of the vehicle to correspond with a deceleration target for the selected vehicle driving mode;
comparing sensor data with the deceleration target to generate a deceleration feedback signal; and
adjusting the plurality of deceleration control signals based on the deceleration feedback signal to effect the controlled deceleration.

11. The method of claim 10, wherein the sensing the deceleration of the vehicle comprises:
receiving sensor data, via an accelerator sensor device, to indicate an accelerator-off value for the vehicle.

12. The method of claim 10, wherein the plurality of deceleration control signals include at least two of:
- a throttle control signal;
- a grill shutter control signal;
- an alternator load control signal;
- an air conditioner compressor control signal; and
- a transmission lock-up control signal.

13. The method of claim 10, wherein the sensor data comprises at least one of:
- instantaneous vehicle speed sensor data generated by a vehicle speed sensor device;
- relational vehicle speed sensor data based on operation of a sensor input device; and
- acceleration data from an acceleration sensor device.

14. The method of claim 10, wherein the adjusting the plurality of deceleration control signals further comprises:
generating a set of the plurality of deceleration control signals based on the deceleration feedback signal to prompt a modified controlled deceleration of the vehicle.

15. The method of claim 10, wherein the adjusting the plurality of deceleration control signals further comprises:
selecting at least one other of the plurality of deceleration control signals to further prompt the deceleration of the vehicle to correspond with a deceleration target for the selected vehicle driving mode; and
transmitting the at least one other of the plurality of deceleration control signals.

16. A vehicle control unit comprising:
a wireless communication interface to service communication with a vehicle network;
a processor coupled to the wireless communication interface, the processor controlling operations of the vehicle control unit; and
a memory coupled to the processor, the memory storing data and program instructions used by the processor, the processor configured to execute instructions stored in the memory that cause the processor to:
sense a vehicle deceleration;
produce, in response, a plurality of deceleration control signals based on a deceleration target for a selected vehicle driving mode, wherein the selected vehicle driving mode is one of a plurality of vehicle driving modes;
transmit, via the wireless communication interface, at least one of the plurality of deceleration control signals to prompt a controlled vehicle deceleration to correspond with a deceleration target for the selected vehicle driving mode;
receive sensor data relating to the vehicle deceleration;
compare at least some of the sensor data with the deceleration target to generate a deceleration feedback signal; and
adjust the plurality of deceleration control signals based on the deceleration feedback signal to effect the controlled vehicle deceleration.

17. The vehicle control unit of claim 16, wherein the processor is further configured to execute further instructions stored in the memory to sense the vehicle deceleration by:
receiving sensor data, via an accelerator sensor device, to indicate an accelerator-off value.

18. The vehicle control unit of claim 16, wherein the plurality of deceleration control signals includes at least two of:
- a throttle control signal;
- a grill shutter control signal;
- an alternator load control signal;
- an air conditioner compressor control signal; and
- a transmission lock-up control signal.

19. The vehicle control unit of claim 16, wherein the processor is further configured to execute further instructions stored in the memory to adjust the plurality of deceleration control signals by:
generating a set of the plurality of deceleration control signals based on the deceleration feedback signal to prompt a modified vehicle deceleration.

20. The vehicle control unit of claim 16, wherein the processor is further configured to execute further instructions stored in the memory to adjust the plurality of deceleration control signals by:

selecting at least one other of the plurality of deceleration control signals to further prompt the vehicle deceleration to correspond with a deceleration target for the selected vehicle driving mode; and transmitting the at least one other of the plurality of deceleration control signals.

* * * * *